US012255009B2

(12) United States Patent
Naor Pomerantz et al.

(10) Patent No.: US 12,255,009 B2
(45) Date of Patent: Mar. 18, 2025

(54) PARTIALLY-CONDUCTING TRANSFORMER BOBBIN

(71) Applicant: Solaredge Technologies Ltd., Herzeliya (IL)

(72) Inventors: Adi Naor Pomerantz, Tel Aviv (IL); Tzachi Glovinsky, Petah Tikva (IL); Nikolay Tal, Karmiel (IL)

(73) Assignee: Solaredge Technologies Ltd., Herzeliya (IL)

( * ) Notice: Subject to any disclaimer, the term of this patent is extended or adjusted under 35 U.S.C. 154(b) by 423 days.

(21) Appl. No.: 16/406,303

(22) Filed: May 8, 2019

(65) Prior Publication Data

US 2019/0355510 A1 Nov. 21, 2019

Related U.S. Application Data

(60) Provisional application No. 62/672,116, filed on May 16, 2018.

(51) Int. Cl.

| | |
|---|---|
| ***H01F 27/32*** | (2006.01) |
| ***H01F 27/24*** | (2006.01) |
| ***H01F 27/36*** | (2006.01) |

(52) U.S. Cl.

CPC ........... *H01F 27/325* (2013.01); *H01F 27/24* (2013.01); *H01F 27/363* (2020.08)

(58) Field of Classification Search

CPC ........ H01F 27/325; H01F 27/24; H01F 27/34; H01F 27/2885; H01F 27/36; H01F 5/02; H01F 27/306; H01F 27/02; H01F 2027/348

See application file for complete search history.

(56) References Cited

U.S. PATENT DOCUMENTS

| | | | | | |
|---|---|---|---|---|---|
| 1,608,891 | A | * | 11/1926 | Lee | H01F 38/12 336/196 |
| 1,940,840 | A | * | 12/1933 | Bellaschi | H01F 27/363 336/231 |
| 2,949,591 | A | * | 8/1960 | Craige | H01F 17/043 336/212 |
| 3,265,998 | A | * | 8/1966 | Park | H01F 27/363 336/84 R |
| 3,299,383 | A | * | 1/1967 | Conner | H01F 38/30 336/84 R |

(Continued)

FOREIGN PATENT DOCUMENTS

| | | | |
|---|---|---|---|
| CH | 376578 | A | 4/1964 |
| DE | 2061305 | A1 | 6/1972 |

(Continued)

OTHER PUBLICATIONS

Sep. 26, 2019—Extended European Search Report—EP 19173330.2.

(Continued)

*Primary Examiner* — Mang Tin Bik Lian

(74) *Attorney, Agent, or Firm* — Banner & Witcoff, Ltd.

(57) ABSTRACT

A bobbin, which may comprise a hollow cylindrical shell, wherein the hollow cylindrical shell may define or otherwise comprise an inner cavity. The bobbin may comprise one or more flanges located near an end of the hollow cylindrical shell, wherein the flange(s) extends, at least in part, radially away from the inner cavity, wherein the flange(s) comprises a region of partial conductivity.

22 Claims, 3 Drawing Sheets

(56) References Cited

U.S. PATENT DOCUMENTS

| | | | | | |
|---|---|---|---|---|---|
| 3,393,388 | A * | 7/1968 | Young, V | H01F 27/36 | 336/84 R |
| 3,461,413 | A * | 8/1969 | Wood | H01F 27/363 | 336/84 R |
| 3,675,175 | A * | 7/1972 | Dutton | H01F 27/363 | 336/84 R |
| 4,250,479 | A | 2/1981 | Bausch et al. | | |
| 4,356,468 | A | 10/1982 | van Laar | | |
| 4,449,111 | A * | 5/1984 | Nakajima | H01F 27/323 | 336/206 |
| 5,469,124 | A * | 11/1995 | O'Donnell | H01F 27/06 | 336/210 |
| 6,005,468 | A * | 12/1999 | Shirahata | H01F 27/306 | 336/210 |
| 6,593,836 | B1 | 7/2003 | LaFleur et al. | | |
| 6,777,845 | B2 * | 8/2004 | York | H02K 3/528 | 310/194 |
| 8,692,643 | B2 * | 4/2014 | Weber | H01F 27/2895 | 336/205 |
| 9,697,949 | B2 | 7/2017 | Ryoo et al. | | |
| 9,941,045 | B2 | 4/2018 | Pollock et al. | | |
| 2001/0033216 | A1 * | 10/2001 | Shirahata | H01F 30/12 | 336/5 |
| 2004/0008102 | A1 * | 1/2004 | Nakazaki | H03K 17/9505 | 336/65 |
| 2009/0115559 | A1 * | 5/2009 | Feist | H01F 5/02 | 336/105 |
| 2010/0013345 | A1 * | 1/2010 | Yarger | H01F 27/366 | 310/216.003 |
| 2013/0154782 | A1 * | 6/2013 | Won | H01F 27/29 | 242/430 |
| 2014/0139313 | A1 * | 5/2014 | Zhou | B65H 75/14 | 335/297 |
| 2016/0233018 | A1 * | 8/2016 | Gu | H01F 27/2885 | |
| 2017/0154723 | A1 * | 6/2017 | Miki | H01F 27/02 | |
| 2018/0075963 | A1 * | 3/2018 | Veenstra | H01F 27/324 | |

FOREIGN PATENT DOCUMENTS

| | | | |
|---|---|---|---|
| GB | 1415917 | A | 12/1975 |
| JP | S49115448 | A | 11/1974 |
| JP | S59177923 | U | 11/1984 |
| JP | S6052609 | U | 4/1985 |
| JP | H0572116 | U | 9/1993 |
| JP | 2000082625 | A | 3/2000 |
| JP | 2013512540 | A | 4/2013 |
| JP | 2013529852 | A | 7/2013 |
| JP | 2019092915 | A | 6/2019 |

OTHER PUBLICATIONS

Casmero, J. & Barden, R, "Transformer Bobbin and Core Selection Involves Interdisciplinary Design and Cost Issues," PCIM, Oct. 2000.

May 28, 2024—Japanese Notice of Allowance—JP App. No. 2019-092915.

* cited by examiner

PARTIALLY-CONDUCTING TRANSFORMER BOBBIN

CROSS-REFERENCE TO RELATED APPLICATIONS

The present application claims priority to U.S. Provisional Patent Application Ser. No. 62/672,116, filed May 16, 2018, which is hereby incorporated by reference as to its entirety.

BACKGROUND

The present disclosure relates to the field of electronic components and devices containing electronic components.

The bobbin of a transformer is an electric transformer component that allows a-priori preparation of coil windings around a magnetic core for the transformation of voltages, isolation, and/or the like. Typically, a transformer may have at least primary and secondary windings. The primary windings may be electrically connected to input voltage electronics and the secondary windings may be electrically connected to the output voltage electronics. The input and output voltage electronics may be simple electrical conductors, complicated switching/rectifying electronics, and/or the like.

In high-voltage transformers, the primary and/or secondary windings may have very high voltage relative to ground, such as between 1 kilo-volts (KV) to 100 KV, and may be alternating current (AC) and/or direct current (DC), such as comprising direct and/or cyclic voltage/current components. The high-voltage windings may be insulated from low-voltage electronic components with an insulation resin (such as a matrix), such as epoxy, silicon, polyurethane, and/or the like. The voltage differences between the high voltages, low voltages, and/or a grounded component may produce electrical fields that extend beyond the insulation, such as through the bobbin material, and/or the like, thereby producing an electrical potential on the bobbin surface.

Typically, high voltage transformers are molded with an electrically insulating material, with optional degassing, to limit the air gaps between the high voltage electrical components and low voltage electrical components. Since the permittivity of the insulating material is much higher than air, the breakdown voltage is much decreased and little or no arcing occurs.

SUMMARY

The following summary is a short summary of some of the inventive concepts for illustrative purposes only and is not an extensive overview, and is not intended to identify key or critical elements, or to limit or constrain the inventions and examples in the detailed description. One skilled in the art will recognize other novel combinations and features from the detailed description.

According to aspects of the disclosure herein, a region of a coil support structure, such as a bobbin, comprises a partially conducting material, a partially conducting surface, and/or the like. As used herein, the term "bobbin" means any coil support structure, such as part of a transformer, an inductor, a relay, an electromagnet, a power supply, an inverter, and/or the like. The bobbin may be made of a material having a particular desired resistivity, for example, a material with a volume resistivity between 0.001 ohm·meter and 10 kilo-ohm-meter, and the bobbin may be part of a component (such as a transformer) that in turn is part of a larger device (such as a power supply). The bobbin may comprise a surface coating with a particular desired sheet resistivity, such as between 0.01 ohm/square and 10 mega-ohm/square. The partially conductive region and/or the geometry of the bobbin may reduce the electrical field external to the bobbin structure, which may in turn reduce the risk of electrical discharge between the structure and a component with a substantially different voltage, such as a grounded component of a high voltage transformer/power supply.

According to aspects of the disclosure herein, the partially conducting region of the bobbin may comprise an electrically isolated region (such as a slot, gap, filler, and/or the like) along the length of the region, which may interrupt the partially conducting region from completely encircling the coil axis and thus may limit eddy currents in the partially conducting region. The length of the region may be between 0.25 millimeters for a small transformer bobbin with a region covering the flange only, to 40 centimeters for a large transformer bobbin made from a partially conducting material.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

Figure 1A:
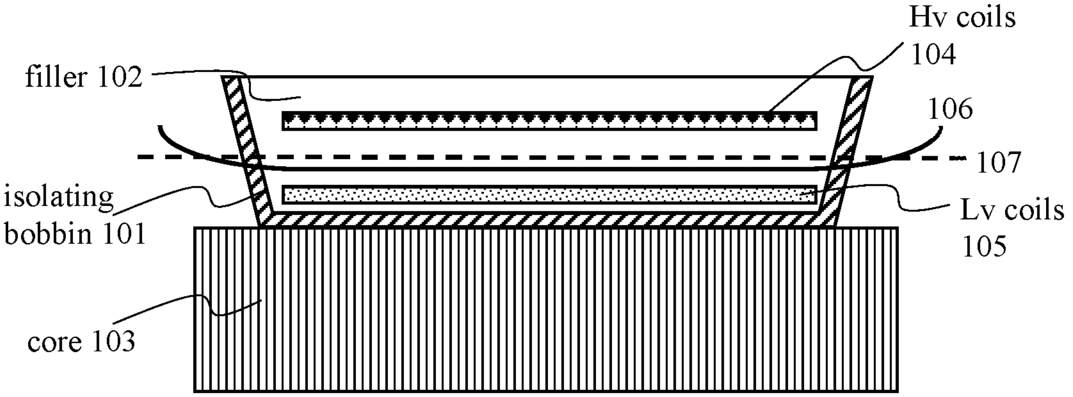
FIG. 1A shows schematically an example bobbin without a partially conducting region, shown with 3 kilo-volt lines. The bobbin may be part of, for example, an electrical transformer or other apparatus such as a component, device, or system.

The accompanying drawings, which form a part hereof, show examples of the disclosure. It is to be understood that the examples shown in the drawings and/or discussed herein are non-exclusive and that there are other examples of how the disclosure may be practiced.

Disclosed herein are example aspects of features for devices, methods, and systems that may be used for impeding (for example, preventing) arc formation between the surface of a coil support structure, such as a transformer bobbin, and a grounded electronic component, such as a magnetic core of the transformer. The electrical field between a high voltage coil enclosed in a bobbin (and/or the like) and a grounded component may be reduced on the bobbin surface using a partially conductive surface and/or material, such as a conducting polymer/composite and/or the like, covering at least part of the bobbin. Resistive changes to the bobbin and/or the bobbin geometry may reduce the electrical field outside of the bobbin. Thus, the electrical potential on the surface of the bobbin may be less than a voltage required to form an electrical discharge, such as the air breakdown voltage.

The partially conducting material/surface may be chosen with a resistivity that is low enough to limit charge buildup and/or voltage increasing on the bobbin surface, but high enough so that losses from the transformer operation are not excessive. For example, excessive losses of the operation of the transformer may produce more heat and therefore limit the application of the transformer to well cooled power supplies. The geometric design of the bobbin may be further modified to reduce the sensitivity of the design to arcing, eddy currents, and/or the like. Aspects of the features disclosed herein may also reduce the likelihood of surface arcing, surface flashovers, and/or the like. Aspects of the features disclosed herein may also reduce the electrical field outside of the transformer, which may be useful for other purposes, for example to reduce EMI or in other situations where the electric field outside the bobbin is too high.

The partially conducting regions of the bobbin may be grounded to allow accumulated charge on the regions to flow to ground, thereby reducing the electric field on the bobbin surface. For example, a surface coating or partially conductive bobbin may be grounded by contact with a grounded magnetic core. For example, an inner surface (such as distal from the magnetic core) of a bobbin may be grounded with an external electrical connection, such as an electrical conductor, and/or the like.

Multiple bobbins, such as two or more bobbins, two or more bobbin parts, and/or the like, may be used for a transformer, such as one bobbin for the low voltage coils and another bobbin for the mid/high voltage coils. Each bobbin may comprise a partially conducting material and/or partially conducting surface(s) covering at least part of the bobbin. One bobbin, of two or more bobbins in a transformer, may comprise a partially conducting material and/or partially conducting surface(s). In other examples, more than one of the bobbins, or even all of the bobbins, may comprise a partially conducting material and/or partially conducting surface(s).

The bobbin may be a shell, such as a hollow cylindrical shell, with flanges on one or both ends to partially or fully enclose the primary and/or secondary windings, such as primary and secondary coils. The bobbin may be embedded in a material, such as a polymer such as a resin, a plastic, and/or the like. The bobbin may have one flange where the coils are closer to the edge of the shell. The shell may have an inner cavity that substantially follows the shape of a magnetic core, and may have an outer cross section having the shape of a circle, a square, a square with rounded corners, an oval, a polygon, a polygon with rounded corners, and of the like.

In high voltage transformers, electrical fields may develop on surfaces of insulating parts, such as the bobbin surface, and the electric fields may cause voltage differences to develop on the surfaces relative to another potential such as ground. The voltage differences may be high, such as 10's of thousands of volts (V). To prevent electrical discharge, such as arcing, arcs, partial discharge, coronas, sparks, and/or the like, between the high potential surface and another potential such as a grounded core, the bobbin material properties and geometry may be adjusted. The bobbin material may be a partially conducting material, such as a polymer mixed with an additive conducting material. For example, a volume resistivity of the bobbin material between 0.3 and 10 ohm·meter may be used for a transformer operating at or around 30 kilo-volt (KV) voltage. For example, a volume resistivity of the bobbin material between 0.1 and 100 ohm·meter may be used for a transformer operating in the range of 10 to 50 KV voltage. For example, a volume resistivity of the bobbin material between 0.01 and 1,000 ohm·meter may be used for a transformer operating in the range of 1 to 500 KV voltage.

The specific resistivity value for the bobbin material may be determined based on the coil's operational voltage range, winding geometry, the bobbin geometry/materials, the insulation geometry/materials, the core geometry, the core material, the line frequency, the frequency difference between the transformer coils, and/or the like. A coating, paint, film, plating, fabric, sheet, casted particles, and/or the like, may be used on the inner and/or outer surface of the bobbin to achieve the desired resistivity. For example, a 2 ohm·meter volume resistivity of a 1 millimeter (mm) thick bobbin material may be equivalent to a 2 kilo-ohm/square (K-ohm/sq) sheet resistivity of a conductive coating, such as a paint and/or the like. For example, a sheet resistivity of the bobbin material between 0.3 kilo-ohm/square and 10 kilo-ohm/square may be used for a transformer operating at or around 30 KV voltage. For example, a sheet resistivity of the bobbin material between 1 ohm/square and 100 kilo-ohm/square may be used for a transformer operating in the range of 10 to 50 KV voltage. For example, a sheet resistivity of the bobbin material between 0.1 ohm/square and 1 mega-ohm/square may be used for a transformer operating in the range of 1 to 500 KV voltage.

An electrical field grading material may be used to prevent discharge between the bobbin and ground. For example, varistor micro-particles may be incorporated in at least a portion of the bobbin material, and the varistor micro-particles may reduce the electrical potential developed on the surface of the bobbin, such as when an overvoltage condition of the coil exists.

To prevent the conductive bobbin from developing eddy currents (or to at least reduce such eddy currents), such as on a conductive coating and/or the like, the mechanical design of the bobbin and/or conductive surface may incorporate an interrupting portion (such as a slot or gap substantially parallel to the bobbin cylindrical axis), that interrupts a closed loop of the partial conducting region around (such as encircling) the magnetic core. The interrupting portion may be empty (such as a void), partially or fully filled with one or more materials such as casting resin, be or otherwise include an insulating sheet, and/or the like. The interrupting portion may be relatively non-conductive compared with, or of a higher resistivity than, the material within (and/or on) which the interrupting portion resides. The interrupting portion may be of any shape and size as desired.

The electrical potential on the bobbin surface may be in close proximity to a component at another potential, such as the magnetic core, a grounded electrical component, and/or the like. When the surface induced voltage and component geometry result in a voltage difference above the breakthrough potential for air, an arc may be formed that may degrade the bobbin, insulation, core, and/or the like. As used herein, the term "arc" is used to refer to electrical discharge between a high electrical potential and a low electrical potential, regardless of the time duration of the discharge. The term arc may refer herein, mutatis mutandis, to the surface arcing phenomenon.

For example, the high voltage (Hv) coils induce a surface voltage potential on the bobbin surface from between 10 KV and 1 KV, where the 10 KV potential is closer to the Hv coil, such as the bobbin surface near the Hv coil, and the 1 KV is furthest form the Hv coil, such as along the bobbin surface close to the grounded core. When the surface potential on the bobbin exceeds the breakdown voltage at any point, an arc may be formed from that point, or a nearby point such as in the case of impurities, to the grounded core.

To prevent or impede formation of an arc, aspects of embodiments described herein may modify the electrical field strength reaching an air interface surface, such as using a conducting composite layer, and/or the like, so that higher potentials are prevented from developing on the surface, such as the bobbin surface near the Hv coil. For example, the resistivity of the bobbin material and/or surface is modified so that it is at least partially conductive and thereby limits electrical charge from accumulating on the surface, such as a charge that increases the surface electrical potential relative to a grounded component.

The location and/or shape of the bobbin surface may be changed so that the electrical potential differences developed on the surface of the bobbin are reduced. For example, when the bobbin surface follows uniform electrical field lines (such as equipotential lines), the likelihood of surface flashovers may be reduced. For example, the electrical field on the surface of the bobbin may be configured to be below the air breakdown field at all points along the surface of the bobbin by following a Rogowski profile, reducing the likelihood of an electrical arc forming.

The above description applies to any embodiments, including any of the example embodiments described with respect to any of the figures, as follows.

Reference is now made to FIG. 1A, which shows schematically a cross-section of an example bobbin 101 without a partially conducting region, shown with 3 KV lines, although any other voltage lines may be used. The bobbin 101 may be part of, for example, an electrical transformer or other component or device. The figure shows the bobbin 101, high 104 and low 105 voltages (Hv and Lv) coils, and a magnetic core 103 that may be grounded. A solid line represents the 3 KV electrical potential 106 line (equipotential line) from the Hv coil, and a dashed line represents the 3 KV air breakdown voltage 107 potential at 1 mm from the grounded core. When a transient or continuous voltage difference between Hv coil 104 and a low voltage electrical component results in an overlap of the electrical potential 106 (which in this example is 3 KV) and the air breakdown voltage 107 (which in this example is 3 KV) on the bobbin surface, there may be locations on the outer surface of the bobbin where the electrical potential may be above air breakdown potential, and an arc may form. For example, when lightning strikes part of the electrical conductors connected to the transformer, a transient voltage difference may exceed 3 KV on the surface and an arc may form.

Figure 1B:
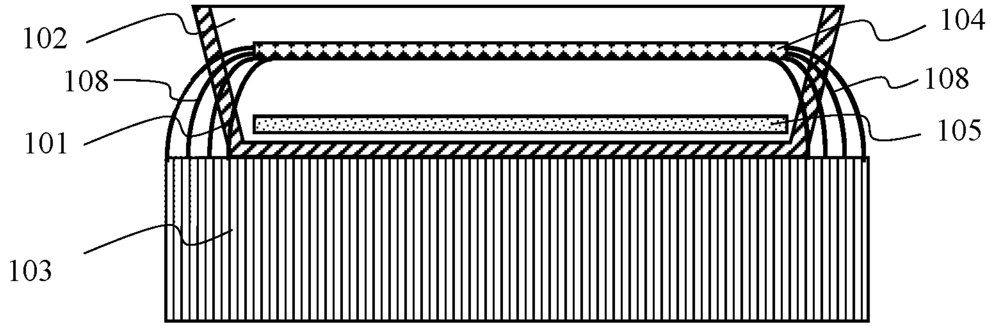
FIG. 1B shows schematically an example bobbin without a partially conducting region, shown with electrical field lines. The bobbin may be part of, for example, an electrical transformer or other component or device.

Reference is now made to FIG. 1B, which shows schematically a cross-section of another example of the bobbin 101 (of FIG. 1) without a partially conducting region, shown with electrical field lines 108. In this example, when the electrical field exceeds $3\times10^6$ V/m on the surface of bobbin 101, and bobbin 101 is surrounded by air, the air breakdown voltage is exceeded and a surface discharge may occur.

Figure 2A:
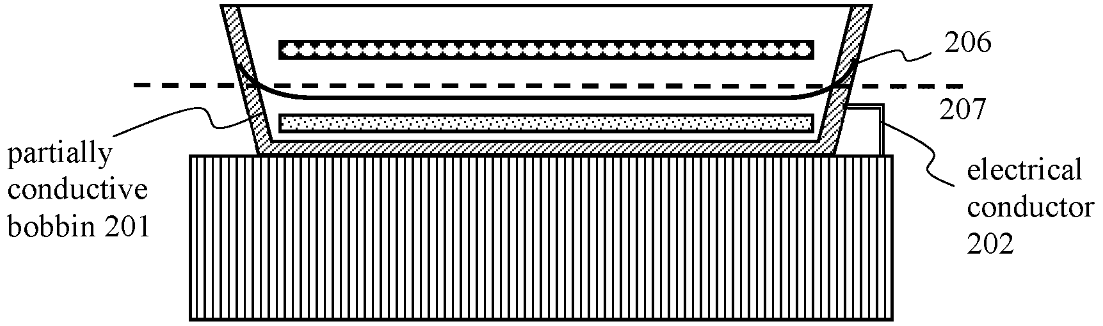
FIG. 2A shows schematically an example bobbin with a partially conducting region, shown with 3 kilo-volt lines. The bobbin may be part of, for example, an electrical transformer or other component or device.

Reference is now made to FIG. 2A, which shows schematically a cross-section of an example bobbin 201 with a partially conducting region shown with 3 KV lines, although any other voltage lines may be used. The bobbin 201 may be part of, for example, an electrical transformer or other component or device. The partially conducting region may be electrically connected using an electrical conductor 202 to a low electrical potential component, such as a grounded magnetic core. In this figure, the bobbin material is manufactured from a partially conducting material, and as in FIG. 1, a solid line represents a 3 KV equipotential line 206 and a dashed line represents a 3 KV air breakdown voltage 207. The 3 KV equipotential line 206 and 3 KV air breakdown voltage 207 intersect inside the bobbin and/or molding material (such as a filler), and therefore the likelihood of arcing may be reduced.

Figure 2B:
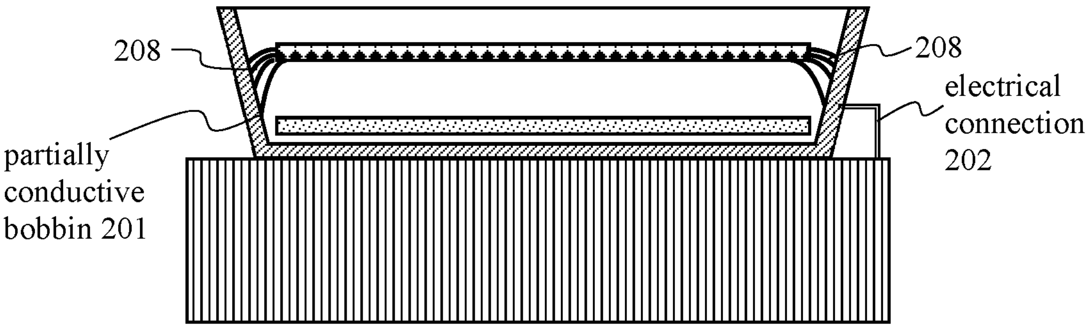
FIG. 2B shows schematically an example bobbin with a partially conducting region, shown with electrical field lines. The bobbin may be part of, for example, an electrical transformer or other component or device.

Reference is now made to FIG. 2B, which shows schematically a cross-section of another example of the bobbin 201 (of FIG. 2) with a partially conducting region, shown with electrical field lines 208. In this example, the partially conducting region of the bobbin 201 may reduce or prevent the electrical field outside the bobbin, and thus the electrical field may not exceed $3\times10^6$ V/m on the surface of bobbin 201, and a surface discharge may be prevented or at least the possibility of a surface discharge reduced.

Figure 3:
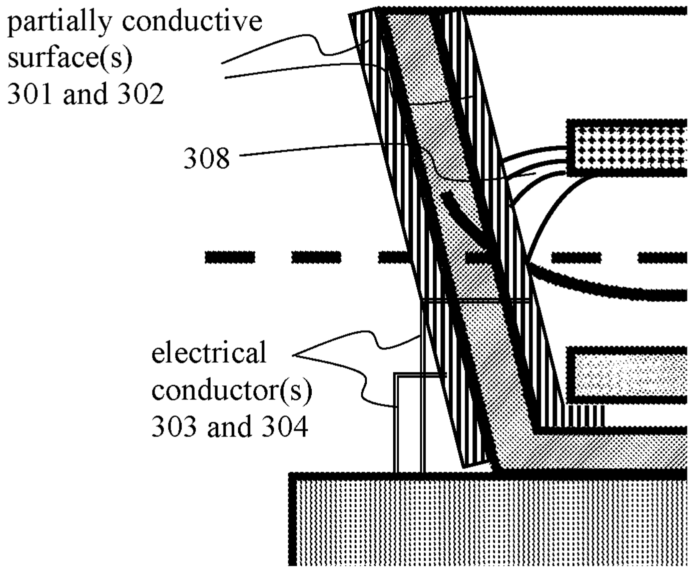
FIG. 3 shows schematically an example bobbin with one or more partially conducting surfaces. The bobbin may be part of, for example, an electrical transformer or other component or device.

Reference is now made to FIG. 3, which shows schematically a cross-section of portion of an example bobbin with one or more partially conducting surfaces 301 and 302. The bobbin of FIG. 3 may be part of, for example, an electrical transformer or other component or device. Partially conducting surfaces 301 and 302 may be on an exterior surface (such as the surface 301 on the left side of the bobbin cross-section) and/or an interior surface (such as the surface 302 on the right side of the bobbin cross-section) of the bobbin. Each partially conducting surface (301 and 302) may have an electrical conductor (respectively, 303 and 304) that electrically connects each surface 301, 302, respectively, to a different (for instance, lower) electrical potential surface. Electrical conductor 303 and/or 304 may by partially conductive to the lower electrical voltage, such as using a series resistor and/or the like. For example, the series resistor of electrical conductor 303 may be different from serial resistor of electrical conductor 304. Electrical conductor 303 and/or 304 may also have one or more capacitors connected serially and/or in parallel, for example to provide different time constants to inner and outer partially conductive surfaces 301 and/or 302.

As in FIG. 2B, for example, the electrical field 308 strength in FIG. 3 (indicated with solid lines) may be reduced by the one or more partially conducting surfaces 301 and 302, thus reducing at least in part the electrical field on the surface of the bobbin and therefore the likelihood of arcing, surface discharges, and/or the like. The configuration of FIG. 3 may be used, including the surfaces 301/302 and/or the conductors 303/304, in any of the other embodiments described herein, such as the embodiments described with respect to FIGS. 1A, 1B, 2A, and 2B.

Figure 4:
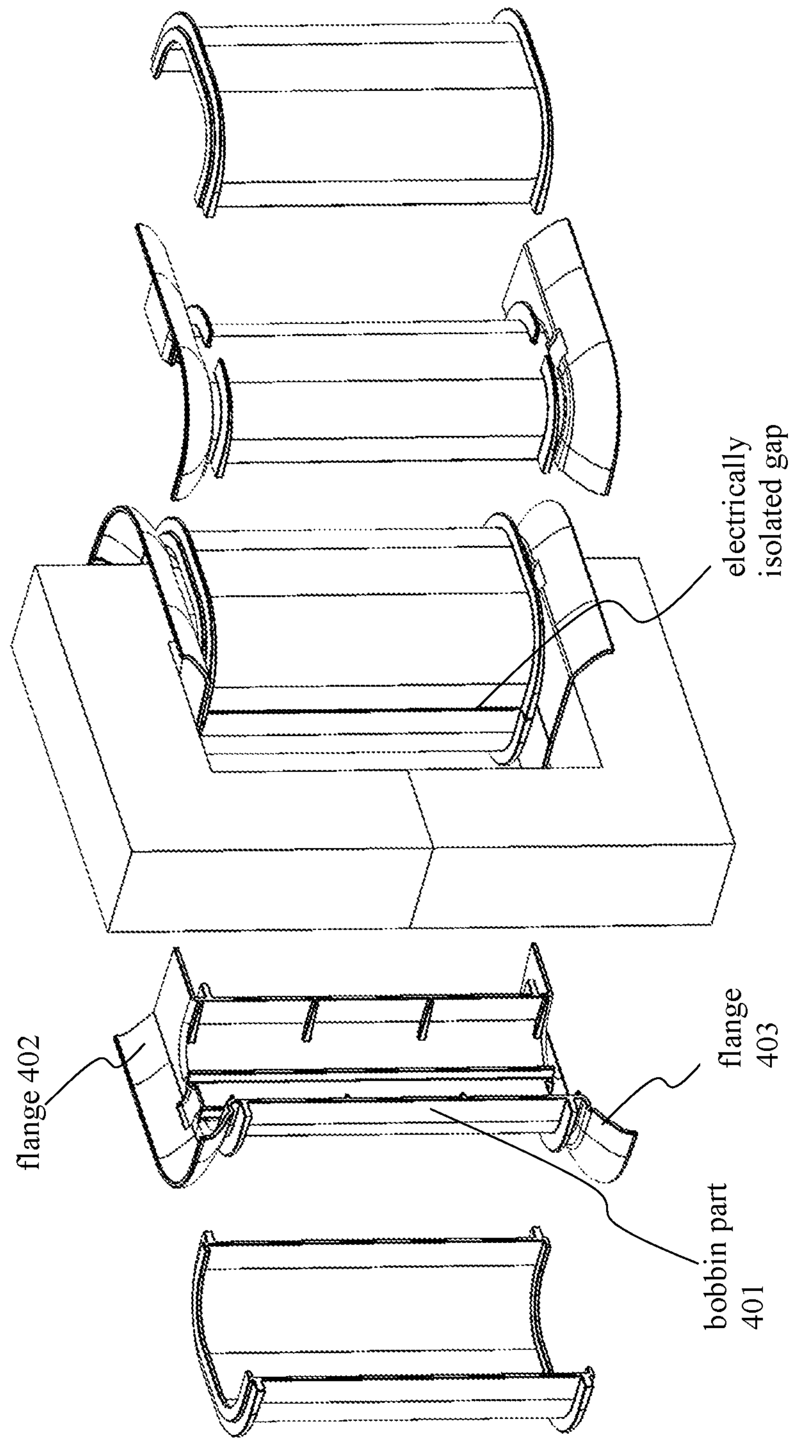
FIG. 4 shows schematically an example electrical transformer assembly with an at least partially conducting bobbin.

Reference is now made to FIG. 4, which shows schematically an exploded view of example electrical transformer assembly with an at least partially conducting bobbin 401. Bobbin 401 may be configured, for example, as any of the bobbins described herein with respect to FIGS. 1A, 1B, 2A, 2B, and 3. Bobbin 401 may comprise flanges 402 and 403, which may be shaped to substantially follow equipotential lines, and thus reduce the likelihood of surface discharges. An electrically isolated gap or other interrupting portion 404 in the partially conducting regions may limit or prevent eddy currents from forming in the region, as the partially conducting regions may not form a closed electrical path (such as a loop) completely around the magnetic field generated be the coil(s). As explained above, the interrupting portion may be empty, may be partially or fully filled with a material, may be embodied as an insulating sheet, and/or the like. The interrupting portion (such as the gap 404) may be incorporated into any of the embodiments described herein, such as the embodiments described with respect to FIGS. 1A, 1B, 2A, 2B, and 3. The electrically isolated gap or other interrupting portion 404 may be arranged along the direction of the magnetic field axis of the transformer, such as the transformer of FIG. 4.

Casting a transformer (such as the transformer of FIG. 4) entirely in an insulating material, such as epoxy, may insulate the transformer thermally, thereby raising the operational temperature and lowering the transformer's efficiency. Solutions for dissipating heat generated during operation of the transformer include incorporating thermal conduits through the bobbin to expel the heat. For example, a high voltage transformer operated to convert a total power may produce 0.2% percentage of the total power as heat (such as 200 watts of heat for a 100 kW transformer) from the magnetic core. These solutions may require complicated and expensive heat conduction sub-systems, as well as increase manufacturing costs of the transformer itself. Arcs, sparks, and/or the like, formed within the transformer, may cause degradation of the insulation, further increasing the arc formation, cracking of the magnetic core, oxidation of the magnetic core material, thereby lowering efficiency, and/or the like. Further complications of an insulation-cast transformer may include increased costs due to higher cost heat removal systems, lower yield due to mechanical stresses from insulation curing/cooling, increased weight of the transformer, and/or the like. Partial molding of the bobbin (such as any of the example embodiments of a bobbin described herein, including any of the bobbins described herein with respect to FIGS. 1A, 1B, 2A, 2B, 3, and 4), with materials and geometric design that limit the formation of arcs, sparks, and/or the like, may provide a solution to both thermal and electrical protection of the transformer.

The remainder of this description below, while not necessarily referring specifically to the figures, applies to all of the embodiments of a bobbin (and component or device containing the bobbin) as described herein, including but not limited to the bobbins, components, and devices described herein with respect to FIGS. 1A, 1B, 2A, 2B, 3, and 4. Thus, for example, when referring to a bobbin or transformer, the disclosure below is intended to refer to any of the bobbin or transformer embodiments described throughout this disclosure and with respect to all of the figures.

The electrical potential lowering on the bobbin surface may be provided by some or all of the bobbin material being partially conductive. For example, a partially conductive material may be used to produce bobbins. For example, the bobbin material may be a polymer, and a conductive additive may be added to produce a resistivity within a range that is sufficient to lower the electrical field, and preventing a surface potential from reaching the air breakdown voltage on the surface of the bobbin (such as at the air interface), but without producing unacceptable losses. For example, the bobbin may be covered with a partially conducting surface that has substantially equivalent resistivity to the ranges described above. Various partially conducting materials, additives, coatings, fabrics, films, and/or the like may be used to provide the partial conductivity/resistivity, depending on the desired properties of the bobbin. The bobbin may, for example, comprise a composite material where at least one of the component materials is partially conductive. As another example, the bobbin may comprise a homogenous material with an intrinsic and/or extrinsic partial conductivity, partial resistivity, or partial surface resistivity. As another example, the bobbin may comprise a layered material structure where at least one of the layers has an intrinsic and/or extrinsic partial conductivity, partial resistivity, partial surface resistivity, and/or the like.

For example, bobbin materials may be a matrix comprised of polymers, copolymers, thermosets, thermoplastic, and/or the like, such as polycarbonate (PC), polyether ether ketone (PEEK), polyamide, polypropylene (PP), polyphenylene sulfide (PPS), acrylonitrile butadiene styrene (ABS), polybutylene terephthalate (PBT), polyethylene terephthalate (PET), polyphenylene oxide (PPO), polyphenylene sulfide (PPS), polyvinyl chloride (PVC), polyamide (Nylon), silicone, epoxy, acrylic, any combinations thereof, and/or the like. The partial conductivity of the bobbin matrix may be intrinsic and/or extrinsic by the addition of partially conducting particles.

For example, intrinsic conductivity of an organic polymer may be adjusted by doping with a suitable element and/or material. For example, intrinsically conducting polymers (ICPs) may be organic polymers, polycyclic aromatic compounds, and/or the like, that conduct electricity and the conductivity of conducting polymers may be fine-tuned using methods of organic synthesis, by advanced dispersion techniques, and/or the like. Polyaniline, polypyrrole, polyacetylene, polyphenylene vinylene, polythiophene, polyphenylene sulfide, polyindole, poly(p-phenylene vinylene), poly (3-alkylthiophenes), and/or the like. The following is a table listing further examples of conducting polymers. The listing of conducting polymers in this disclosure, including Table 1 below, is not intended to be an exclusive or limiting list of conducting polymers that can be used.

TABLE 1

Example Conducting Polymers

| The main chain contains | Heteroatoms present: No heteroatom | Nitrogen-containing | Sulfur-containing |
|---|---|---|---|
| Aromatic cycles | poly(fluorene)s<br>polyphenylenes<br>polypyrenes<br>polyazulenes<br>polynaphthalenes | N is in the aromatic cycle:<br>poly(pyrrole)s<br>polycarbazoles<br>polyindoles<br>polyazepines<br>N is outside the | S is in the aromatic cycle:<br>poly(thiophene)s<br>poly (3,4-ethylenedioxythiophene)<br>S is outside the aromatic cycle:<br>poly(p-phenylene |

TABLE 1-continued

Example Conducting Polymers

| The main chain contains | Heteroatoms present: No heteroatom | Nitrogen-containing | Sulfur-containing |
|---|---|---|---|
| | | aromatic cycle: polyanilines | sulfide) |
| Double bonds | poly(acetylene)s | | |
| Aromatic cycles and double bonds | poly(p-phenylene vinylene) | | |

Testing of a bobbin may determine that one or more of the features as described herein are incorporated in the bobbin. For example, visual examination of bobbin geometry (such as the presence of a slot, gap, particular wall thickness, particular flange shape, and/or the like) may be used to determine when some features are incorporated into a transformer and/or bobbin. For example, resistivity testing of bobbin material, such as 4-point testing, ASTM D 257, ASTM B193-16, ASTM F1529-97, ASTM F390-11, and/or the like (depending on the material under test) may reveal that various features as described herein are present. Additional testing may further indicate the presence of certain features, such as by conducting X-ray diffraction for detecting conducting or partially conducting additive in matrix, mass spectroscopy, and/or the like.

The volume resistivity (or the equivalent sheet resistivity) of a bobbin material may be adjusted to a value, for example, in the range from 0.3 ohm·meter (ohm·m) to 10 ohm·m using conductive additives, such as carbon black particles/powder, carbon nanotubes, carbon fibers, carbon particles, metallic particles, semi-metallic particles, coated particles, Cu coated alumina particles, and/or the like. As another example, the volume resistivity (or the equivalent sheet resistivity) may be adjusted, such as increased or decreased, to be in the range from 0.1 ohm·m to 100 ohm·m, depending on the bobbin geometry. Two or more additives may be used to improve the performance and resistivity of polymeric materials. The additive mixture composites may be produced by dispersing fillers (such as additives) homogenously and/or gradually in the host matrix polymer at certain percentages, such as according to weight (wt. %), volume (vol. %), atomic fraction, mole fraction, and/or the like. The tolerance of the bobbin material resistivity may be in the range of ±50-100% of the resistivity value. For example, the line frequency of 50-60 Hz may be considered quasi-static, thus the mobility of charges may be associated with an intermediate conductivity. On the other hand, a low resistivity may result in increased transformer losses, such as from heat generation, eddy currents, and/or the like, and thus a higher resistivity value may improve the efficiency of the transformer. The base polymer matrix may be modified by the addition of other fillers and/or additives to modify other properties of the bobbin, such as mechanical properties, high temperature durability, UV durability, impact resistance, thermal properties, flame retardancy, etc.

The sheet resistivity of a coating on at least part of the bobbin surface (such as the surfaces 303 and/or 304) may have a range from 0.1 ohm/sq to 100 K-ohm/sq using a coating, a partially conductive film, a metallized or metal plated film, metallic laminated polymeric film, a paint layer, a fabric, a surface treatment, and/or the like. The coating may be applied using various techniques, such as by dipping, spraying, evaporation, extrusion, electrochemically, plating, deposition, and/or the like.

For example, a coating of a modified phenolic resin with a partially conductive filler producing a surface resistivity of 3 K-ohm/sq and thickness of 10 micrometers may be used to prevent arcing between the bobbin surface and the magnetic core. As another example, a shrink fit tubing and/or film may be used to provide a sheet resistivity to the bobbin. As another example, a film of partially conductive material may be constructed with outer insulating layers and the film is formed to cover the one or more flanges of the bobbin. For example, when the film is wrapped around the bobbin flange (such as flanges 402 and/or 403), there may be an overlap of the film when applied around the bobbin flange such that complete coverage of a partially conducting surface is provided, but a closed loop of partially conductive material is prevented around the circumference of the bobbin, thus preventing eddy currents. For example, the width of the insulating layer of the film may be greater than the width of the partially conductive material, thus when the film is wrapped, the conducing layer is overlapping.

Electrical field grading materials may be used to reduce the electrical stress and may prevent a high electrical potential from developing on the bobbin surface. For example, adding particles of ZnO microvaristors and/or the like to the bobbin materials may reduce the electrical stress (such as the electrical potential) on the surface of the bobbin as a non-linear function of the electrical field strength. Thus, the particles may reduce the likelihood of, or even prevent, high electrical fields from reaching the surface of the bobbin, but low electrical fields may "see" high resistance, reducing losses. For example, varistor particles incorporated into the bobbin material may prevent arcing from momentary overvoltages on the input conductors, such as voltage spikes.

In further examples, a combination of conducting and varistor micro-particles may be used in the bobbin materials to provide both steady state and transient arc protection.

A mold insert may be incorporated into the bobbin during formation within a mold, such as a partially conducting or conducting mesh, sheet, and/or the like. For example, the partially conducting insert may be limited to the at least one flange following the locations where charges are formed on the bobbin surface, thus limiting the electrical field strength at these locations selectively. For example, the at least one flange may comprise a mold insert of a partially conducting material that has a protruding wire for a ground electrical connection.

Sheet resistivity of the partially conducting material may be in the range of, for example, 0.1 to 100 ohm·m, or 0.1 to 100 K-ohm/sq. Among other factors, the resistivity may depend on the frequency or time rate-of-change of the electrical fields, so that charges are able to move freely enough to reorient themselves as fast as the field changes. The charge movements may allow cancellation of the external electrical fields, at least in part. On the other hand, the more conductive the material, the higher the losses of the transformer may be and the lower the efficiency may be. The efficiency loss due to the bobbin material conductivity may change as a function of the resistivity according to a rule in the range of values discussed herein, such as a linear relationship rule, a power relationship rule, an exponential relationship rule, an n-th order polynomial relationship rule, and/or the like.

The primary and secondary coils may comprise both a DC voltage relative to ground, and an AC voltage from the switching frequency. The line input and output coils may be isolated and thus may have a high voltage relative to ground or to a lower voltage electrical component. For example, the Hv coil may have a voltage of 50 KV relative to the voltage of the magnetic core, such as during a lightning strike near the transformer. For example, the Hv coil may have a voltage of 50 KV relative to the voltage of the magnetic core, and produce an electrical field greater than $3\times10^6$ V/m on a solid-air interface of the bobbin, transformer, power supply, and/or the like, and a surface discharge may occur.

The bobbin may comprise low voltage coils wound around the bobbin, an insulating layer, a second bobbin, high voltage coils, and/or the like. The geometry of the bobbin, transformer, the coil winding directions, the coil winding shapes, and/or the like may influence the electrical field strengths generated on air/surface interfaces, between interfaces and low voltage electrical components, and/or the like. For example, a circular winding configuration of an Hv coil around a square magnetic core may produce higher electrical fields at the interface between the corners of the square and the nearest coil loops.

As the surface of the bobbin acts as the anode during an arc discharge, the further the bobbin surface and/or coil geometry is from the grounded electrical component (or low voltage electrical component), the less chance that an arc may form.

The one or more flanges (e.g., flanges 402 and/or 403) of a bobbin may substantially follow the shape of an equipotential line of the electrical field between the Hv coil and a ground plane. For example, the flanges may substantially follow a Rogowski profile, a Borda profile, a Bruce profile, a Cheng profile, an Ernst profile, and/or the like. By substantially following an equipotential line, an electrical field between the Hv coils and the flange may be more uniform.

Isolating and bobbin materials may be selected to have similar relative permittivity values, thus reducing the likelihood of electrical field effects at the material interfaces. For example, the bobbin may be manufactured from a polyester resin with relative permittivity of 3.59, and the isolating filler may be an epoxy resin with a relative permittivity of 3.6. The selection of the materials' relative permittivity may allow further modification of the electrical field on an air-solid interface between the Hv coil and a lower potential electrical component, such as the magnetic core.

The core of a transformer may be formed from a ferromagnetic material, such as iron, laminated silicon steel, alloys, amorphous metal, powdered metals, carbonyl iron, hydrogen-reduced iron, molypermalloy, ceramics, etc. In some applications, the core may be an air core.

The core may be constructed using various structures. The core may be constructed, for example, as a single component, or may be formed by fitting together (e.g., stacking) various core components (e.g. "C", "U", "E" or "I" core elements).

The switching of the primary or secondary power supply electronics may affect the electrical potential developed on the high voltage coil relative to a lower voltage electrical component.

The line frequency, such as a higher line frequency, may affect the choice of material resistivity values for the partially conducting region and may require higher charge mobility and hence lower resistivity. For example, a 60-Hz line frequency may require higher charge mobility and lower resistivity compared to a 50-Hz line frequency.

The resistivity of the partially conductive region of the bobbin may be adjusted to prevent electrical fields from a transient over-voltage, such as a voltage spike and/or the like, from reaching the breakdown voltage of a surrounding insulator. For example, the resistivity of the partially conducting material may be adjusted so that the time constant for the capacitive and resistive properties of the bobbin and insulation are between 0.1 nano-second and 0.1 second.

The frequency differences between the switching frequencies of the primary and secondary stages of a power supply may affect the resistivity values of the partially conducting region.

Table 2 below is a table of example partially conducting materials. The listing of partially conducting materials in this disclosure, including Table 2 below, is not intended to be an exclusive or limiting list of partially conducting materials that can be used.

TABLE 2

Example Partially Conducting Materials.

| Type | Company | Product | Base material |
|---|---|---|---|
| Plastic/Resin (injection molding) | PREMIX | PRE-ELEC ® TP 16514 | Carbon black filled polypropylene |
| | SHAKUN POLYMERS | SP-SCXL-8888-R and SP-SCXL-8888-H | Cross-linker with carbon black |
| | LOTTE | HA-3203 | PC/GF |
| | ENSINGERPLASTICS | TECAPEEK ELS NANO BLACK | PEEK |
| | ASAHI-KASEI | NA | XYRON ®/polyamide |
| Tape | CHANGCHUN HUICHENG APPLIED CHEMISTRY NEW MATERIALS | T8828 ELECTRICAL SEMI-CONDUCTIVE TAPE | Not mentioned from TDS |
| | 3M | SCOTCH ELECTRICAL SEMI-CONDUCTING TAPE 13 | Ethylene Propylene Rubber (EPR) with conductive particles |
| | VONROLL | CORONASHEILD ® SC 217.02 | Woven polyester fabric impregnate with semi-conductive varnish |

TABLE 2-continued

Example Partially Conducting Materials.

| Type | Company | Product | Base material |
|---|---|---|---|
| | WOER HEAT-SHRINKABLE MATERIAL | SEMI-CONDUCTIVE TUBE WRSBG | thermally stabilize cross linked semi-conductive Polymeric material |
| Coating | VONROLL | CORONASHIELD ® P 8001 | Modified phenolic resin with a semi conductive filler |
| | SHAKUN | SP-PESC-566 | |

Here; as elsewhere in the specification and claims, ranges can be combined to form larger ranges.

Specific dimensions, specific materials, specific ranges, specific resistivities, specific voltages, specific shapes, and/or other specific properties and values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (for example, the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having or involving several parts, elements, or members.

It may be noted that various connections are set forth between elements herein. These connections are described in general and, unless specified otherwise, may be direct or indirect; this specification is not intended to be limiting in this respect, and both direct and indirect connections are envisioned. Further, elements of one feature in any of the embodiments may be combined with elements from other features in any of the embodiments, in any combinations or sub-combinations.

All described features, and modifications of the described features, are usable in all aspects of the inventions taught herein. Furthermore, all of the features, and all of the modifications of the features, of all of the embodiments described herein, are combinable and interchangeable with one another.

What is claimed is:

1. An apparatus comprising:

a bobbin comprising:

a shell configured to at least partially surround a leg of a magnetic core and to support a primary winding and a secondary winding to each be disposed around an outer surface of the shell; and a first flange comprising a region of partial conductivity on a surface of the first flange, wherein in cross section the region of partial conductivity extends diagonally away from the magnetic core, wherein the first flange is shaped to follow a circumference of the shell and to at least partially surround the leg of the magnetic core, and wherein the region of partial conductivity comprises:

a concave surface facing toward the leg of the magnetic core; and a convex surface that is opposite the concave surface and that faces away from the leg of the magnetic core.

2. The apparatus of claim 1, wherein in cross section the region of partial conductivity comprises a curvature that extends over a majority of the region of partial conductivity.

3. The apparatus of claim 1, wherein in cross section the region of partial conductivity substantially follows a Rogowski profile.

4. The apparatus of claim 1, wherein the region of partial conductivity is shaped to substantially follow an equipotential line of an electrical field created from a voltage difference, wherein the voltage difference is:

between the primary winding and the magnetic core; or between the secondary winding and the magnetic core.

5. The apparatus of claim 4, wherein the magnetic core is grounded.

6. The apparatus of claim 1, wherein the region of partial conductivity is a single material.

7. The apparatus of claim 6, wherein the single material comprises a conductive additive distributed throughout the single material.

8. The apparatus of claim 7, wherein the conductive additive comprises microscopic particles of conductive carbon.

9. The apparatus of claim 1, wherein the bobbin further comprises a material with a volume resistivity value configured to provide a partial conductivity to the region of partial conductivity.

10. The apparatus of claim 1, wherein the shell comprises an axial cross-section that is substantially shaped as a circle, an oval, a square, a rectangle, a polygon with rounded corners, or a polygon.

11. The apparatus of claim 1, wherein the region of partial conductivity comprises a volume resistivity in a range between 0.3 ohm·meter and 10 ohm·meter.

12. The apparatus of claim 1, wherein the region of partial conductivity comprises a volume resistivity in a range between 0.1 ohm·meter and 100 ohm·meter.

13. The apparatus of claim 1, wherein the region of partial conductivity comprises a volume resistivity in a range between 0.01 ohm·meter and 1 kilo-ohm·meter.

14. The apparatus of claim 1, wherein the region of partial conductivity comprises a sheet resistivity in a range between 0.3 kilo-ohm/square and 10 kilo-ohm/square.

15. The apparatus of claim 1, wherein the region of partial conductivity comprises a sheet resistivity in a range between 1 ohm/square and 100 kilo-ohm/square.

16. The apparatus of claim 1, wherein the region of partial conductivity comprises a sheet resistivity in a range between 0.1 ohm/square and 1 mega-ohm/square.

17. The apparatus of claim 1, wherein the region of partial conductivity is electrically connected to a low electrical potential or an electrical ground.

18. The apparatus of claim 1, wherein the region of partial conductivity comprises a gap extending from a first edge of the region of partial conductivity to a second edge of the region of partial conductivity, wherein the gap comprises at least one of: an air gap, an insulating material partially filling the gap, an insulated material fully filling the gap, or an insulating sheet.

19. The apparatus of claim 1, further comprising the magnetic core, wherein the bobbin further comprises an electrically isolating gap transecting the region of partial conductivity, and wherein the electrically isolating gap prevents the region of partial conductivity from forming a closed electrical connection encircling the magnetic core.

20. The apparatus of claim 19, wherein the apparatus comprises a transformer that comprises the bobbin, and wherein the electrically isolating gap is arranged along a direction of a magnetic field axis of the transformer.

21. The apparatus of claim 1, wherein:

the first flange is disposed at a first end of the shell and extends in a first diagonal direction away from the shell, and the apparatus further comprises a second flange disposed at a second end of the shell and comprising a second region of partial conductivity, wherein a portion of the second flange extends away from the shell in a second diagonal direction.

22. The apparatus of claim 1, wherein the first flange comprises a first surface and a second surface opposite the first surface, and wherein the region of partial conductivity is disposed at the first surface and is closer to the magnetic core than the second surface.

* * * * *